United States Patent [19]

Hiraoka et al.

[11] Patent Number: 5,612,840
[45] Date of Patent: Mar. 18, 1997

[54] MAGNETIC SPRING ARM ASSEMBLY INCLUDING STRUCTURE FOR PREVENTING DAMAGE TO A CONDUCTIVE LAYER RESULTING FROM BENDING

[75] Inventors: Sinji Hiraoka; Yoshihisa Matsumoto; Isamu Itoh; Shigeo Terashima, all of Kawasaki, Japan

[73] Assignee: Fujitsu Limited, Japan

[21] Appl. No.: 248,334

[22] Filed: May 24, 1994

[30] Foreign Application Priority Data

Aug. 10, 1993 [JP] Japan ..................................... 5-198673

[51] Int. Cl.⁶ .................................................. G11B 5/48
[52] U.S. Cl. ................................................... 360/104
[58] Field of Search ....................................... 360/104

[56] References Cited

U.S. PATENT DOCUMENTS

| 5,185,683 | 2/1993 | Oberg | 360/104 |
| 5,198,945 | 3/1993 | Blaeser | 360/104 |
| 5,392,179 | 2/1995 | Sendoda | 360/104 |

FOREIGN PATENT DOCUMENTS

| 57-20961 | 2/1982 | Japan . |
| 1124114 | 5/1989 | Japan . |
| 421918 | 1/1992 | Japan . |
| 4111217 | 4/1992 | Japan . |
| 4351712 | 12/1992 | Japan . |

*Primary Examiner*—A. J. Heinz
*Attorney, Agent, or Firm*—Greer, Burns & Crain, Ltd.

[57] ABSTRACT

A magnetic head unit is provided by which damage to a conductive-pattern layer formed on a spring arm during a bending process of the spring arm can be prevented. The magnetic head unit comprises a magnetic head and a spring arm having a bent portion which is bent to generate an elastic force. The magnetic head is mounted on an end of the spring arm. At least one conductive-pattern layer is formed on a surface of the spring arm to extend from a gimbal portion where the magnetic head is mounted to a attachment portion where the spring arm is mounted to a member of a magnetic head driving mechanism. The bent portion has a first portion and a second portion separated from the first portion. The conductive-pattern layer passes through the second portion. No external force is applied to the conductive-pattern layer formed during a bending process for the bent portion. A dispersing-pattern layer may be provided for dispersing an external force exerted on the conductive-pattern layer during the bending process of the bent portion so that said conductive-pattern layer is protected from being damaged due to the external force being concentrated onto said conductive-pattern layer.

11 Claims, 17 Drawing Sheets

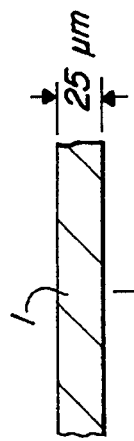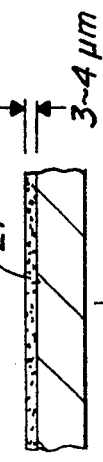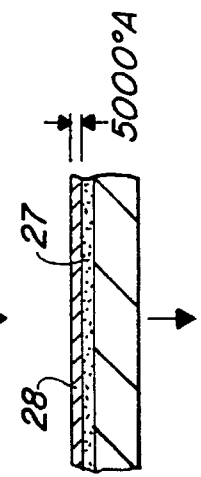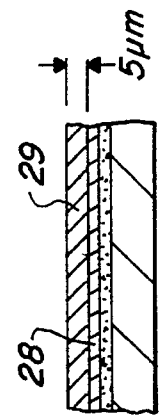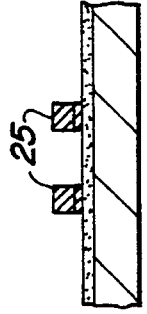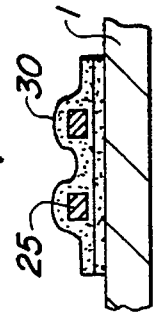
Fig. 6B-1  Fig. 6B-2  Fig. 6B-3  Fig. 6B-4  Fig. 6B-5  Fig. 6B-6
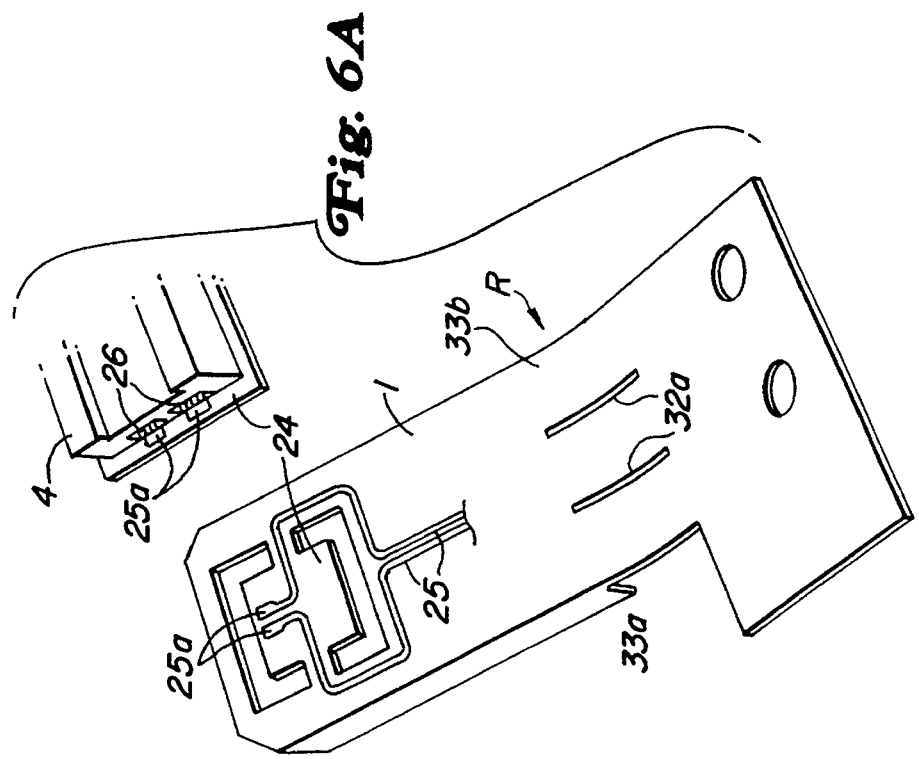
Fig. 6A

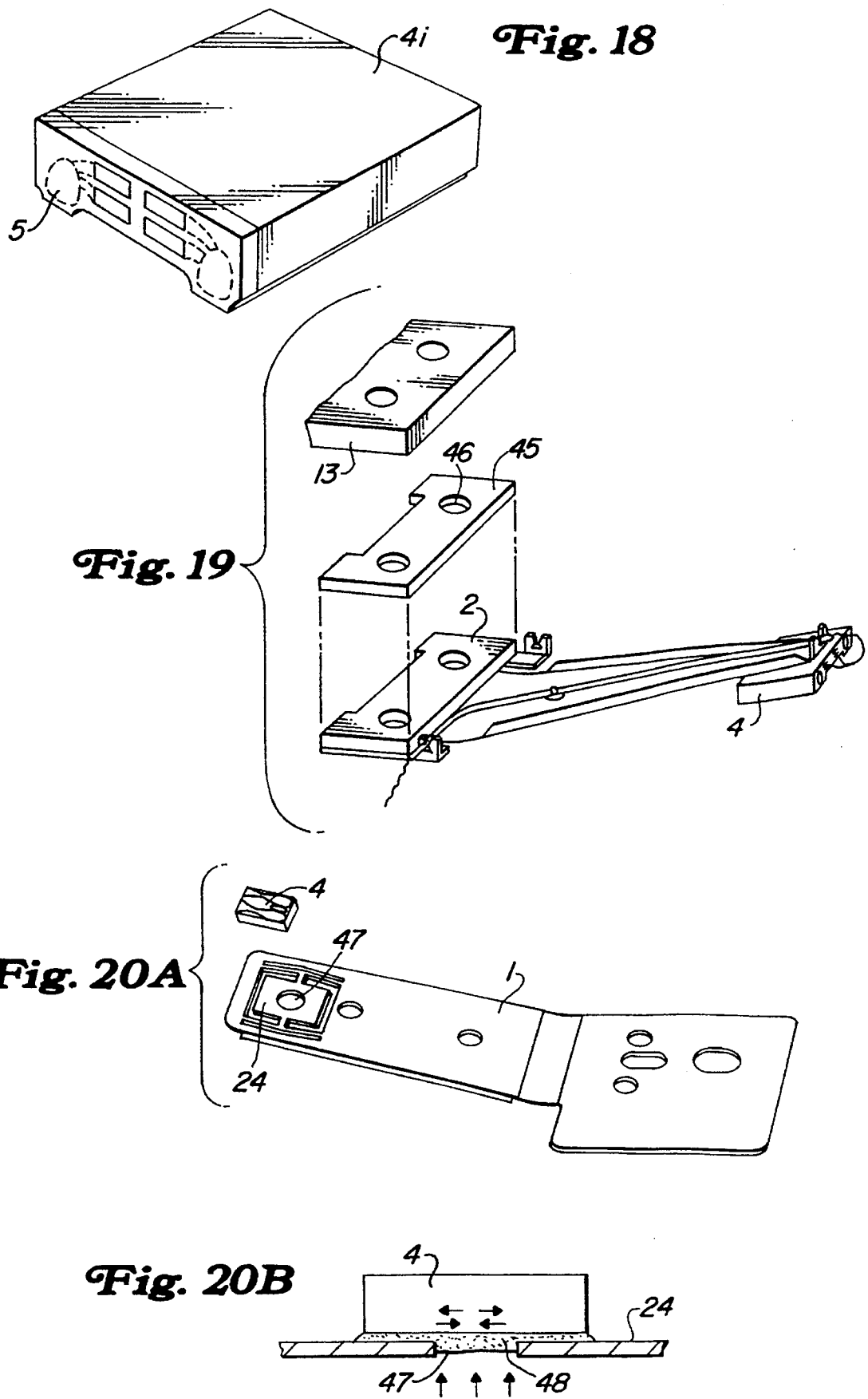

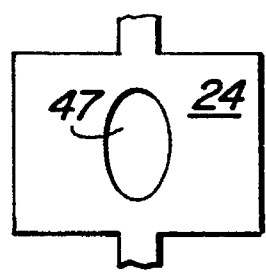
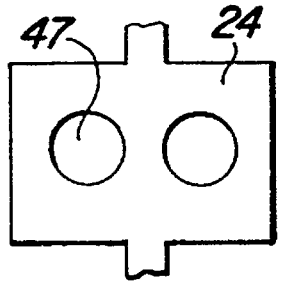
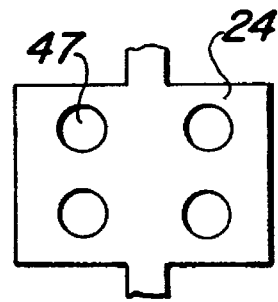
Fig. 21A  Fig. 21B  Fig. 21C
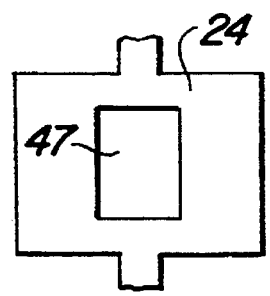
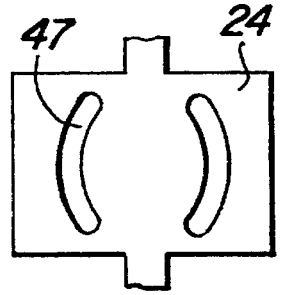
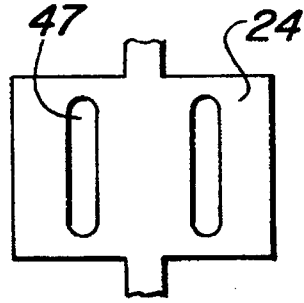
Fig. 21D  Fig. 21E  Fig. 21F

MAGNETIC SPRING ARM ASSEMBLY INCLUDING STRUCTURE FOR PREVENTING DAMAGE TO A CONDUCTIVE LAYER RESULTING FROM BENDING

BACKGROUND OF THE INVENTION

1. Field of the Invention

The present invention relates to a magnetic head unit having a thin-film type magnetic head used for a magnetic disk apparatus.

2. Description of the Related Art

Recently, in conventional magnetic disk apparatuses, monolithic type magnetic heads have been replaced with thin-film type magnetic heads.

FIG. 1A is an exploded view of an example of a magnetic head unit having the thin-film type magnetic head used for the conventional magnetic disk apparatuses. FIG. 1B is an exploded view of a part of the magnetic head unit shown in FIG. 1A. In the present specification, the magnetic head unit refers to an assembly of a spring arm having a magnetic head mounted on an end of the spring arm. The other end of the spring arm is adapted to be mounted on a member of a magnetic head positioning mechanism.

Referring now to FIG. 1A, one end (a base portion 1a) of a spring arm 1 formed of an elastic plate is mounted to a member of a magnetic head positioning mechanism (not shown in the figure) via a plate-like spacer 2. A gimbal 3 is mounted on another end 1b of the spring arm 1. The gimbal 3 is mounted, as shown in FIG. 1B, on the spring arm 1 by means of laser welding at positions indicated by x. A core slider 4 of a magnetic head h is mounted by adhesive on the gimbal 3.

Two magnetic head elements 5 are formed on a rear side surface of the magnetic head, the magnetic head elements 5 being connected by lead wires 6 which lead to a read wire 8 covered with an insulating tube 7 fixed to the spring arm 1. The lead wire 8 is lead to a recording/reproducing circuit 9 shown in FIG. 2.

The spring arm 1 is slightly bent near the base portion 1a so that a bent portion 1c is formed so as to generate a spring force.

FIG. 2 is an exploded view of a conventional magnetic disk apparatus in which two magnetic head units shown in FIG. 1A are used.

Two magnetic head units are mounted on a driving arm 13 which pivots about an axis 12 so that a magnetic disk 10 accommodated inside the magnetic head apparatus is sandwiched between two of the core sliders 4 mounted on the respective spring arms 1. Each of the core sliders 4 is pressed to a respective surface of the magnetic disk 10 by the spring force generated by the bent portion 1c.

When the magnetic disk 10 is rotated at a high speed, the magnetic heads h float, if the magnetic heads h are of the floating type, on the respective surface of the magnetic disk 10 due to an air flow generated by the rotation of the magnetic disk 10. If the magnetic heads h are contact type magnetic heads, the magnetic heads h do not float, but instead slide on the respective surfaces of the magnetic disk 10. The magnetic heads h are moved to respective target tracks on the surfaces of the magnetic disk 10 by pivoting the spring arms about the axis 12.

FIG. 3 is a perspective view of a thin-film type magnetic head. FIG. 4 is an enlarged cross sectional view of the thin-film type magnetic head shown in FIG. 3 taken along a line 4—4 of FIG. 3.

The thin-film type magnetic head shown in FIG. 3 comprises the slider 4 and head elements 5. The head elements 5 are formed by means of a film deposition technique and lithography. Terminals 15a and 15b for recording/reproducing coils are provided near the head elements 5.

Each of the head elements 5 comprises a lower magnetic pole 16, an upper magnetic pole 17 and a thin-film coil 19 wound around a connecting portion 18 between the lower magnetic pole 16 and the upper magnetic pole 17. A gap insulating layer 20 is provided between the lower magnetic pole 16 and the upper magnetic pole 17 so that a gap G having a predetermined width is formed between the two poles. The gap G faces the surface of the magnetic disk 10 to perform a magnetic recording/reproducing operation.

In the construction of the magnetic head unit shown in FIG. 1 in which the lead wire 8 is covered with the insulating tube 7, the insulating tube 7 occupies a relatively large space to prevent miniaturization of the magnetic disk apparatus. Additionally, the insulating tube 7 makes an assembling operation difficult, particularly an automated assembling operation. Further, there is a strong possibility that the lead wire 8 will pick up noises, resulting in degradation of an S/N ratio of a signal sent via the lead wire 8.

In order to eliminate the above-mentioned problems, a method for forming a signal transmitting line on a spring arm is suggested in Japanese Laid-Open Patent Application No. 4-21918. In the method, a signal line is formed of a pattern of a conductive layer on an insulating layer formed on the spring arm. However, the method has a problem in that the signal transmitting line formed of the conductive layer is easily damaged or broken during a process for forming the bent portion 1c shown in FIG. 1A Japanese Laid-Open Patent Application No. 4-111217 discloses a magnetic head unit in which a flexible printed circuit board is attached to a spring arm, and a portion of the flexible circuit board corresponding to the above of the spring arm bent portion is not adhered to the spring arm. Instead, in this construction, the portion of the flexible printed circuit board corresponding to the bent portion of the spring arm is free, and thus the there is no bending stress applied to the flexible printed circuit board. However, this construction cannot be applied to a highly miniaturized spring arm such as a spring arm having a thickness of a few microns and a 4.6 mm width.

There is another problem in that the ability of the insulating layers 21 and 22 of the magnetic head element 5 to withstand dielectric voltage is very low because they each have a thickness of only 1 to a few microns. Accordingly, if a relatively high voltage of about 100 V or more is applied between the thin-film coil 19 and the poles 16 and 17 due to a generation of static electricity, the insulating layers 21 and 22 may be easily damaged due to electric discharge.

If the insulation between the thin-film coil 19 and the poles 16 or 17 is damaged, an electric discharge may occur between the core slider, which is made of a conductive material such as $Al_2O_3TiC$, and the magnetic poles 16 or 17, resulting in the gap G or the floating surface of the core slider 4 being damaged. Additionally, when the magnetic disk apparatus is in operation, an electric discharge may occur between the magnetic disk 10 and the magnetic poles 16 or 17, resulting in the magnetic gap G being damaged. When the core slider 4 is damaged, the floating characteristic of the magnetic head is deteriorated, which condition causes a generation of noises in the recording/reproducing signal. If the magnetic head is a contact type head, the damaged surface of the magnetic head may scratch the magnetic disk 10.

Problems similar to the above-mentioned problems may occur when the core slider is miniaturized. That is, when the magnetic head is heated, the magnetic head tends to expand due to thermal expansion, but a portion of the core slider attached to the gimbal or the spring arm by adhesive cannot expand in accordance with the expansion of the magnetic head. This creates bending of the core slider, and thus the floating characteristic of the magnetic head may be deteriorated.

SUMMARY OF THE INVENTION

It is a general object of the present invention to provide an improved and useful magnetic head unit having a thin-film type magnetic head in which magnetic head unit the above-mentioned disadvantages are eliminated.

A more specific object of the present invention is to provide a magnetic head unit in which damaging of a conductive-pattern layer formed on a spring arm during a process of bending the spring arm can be prevented.

Another object of the present invention is to provide a magnetic head unit in which no insulation breakage occurs due to generation of static electricity.

Another object of the present invention is to provide a magnetic head unit in which thermal deformation of a slider core is prevented.

In order to achieve the above-mentioned objects, there is provided according to the present invention, a magnetic head unit used for a magnetic disk apparatus, the magnetic head unit comprising:

a magnetic head;

a spring arm having a gimbal portion, a bent portion and an attachment portion, the gimbal portion being provided for mounting the magnetic head, the bent portion being provided between the gimbal portion and the attachment portion so that an elastic force for pressing the magnetic head onto a magnetic disk is generated, the attachment portion being provided for mounting the spring arm to a rigid arm; and a conductive-pattern layer, formed on a surface of the spring arm, extending from the gimbal portion to the attachment portion, wherein the bent portion further comprises a first portion and a second portion, the first portion being bent for generating the elastic force, the second portion being bent separate from the first portion; and the conductive-pattern layer passes through the second portion.

There is also provided, according to the present invention, a magnetic head unit used for a magnetic disk apparatus, the magnetic head unit comprising:

a magnetic head;

a spring arm having a gimbal portion, a bent portion and an attachment portion, the gimbal portion being provided for mounting the magnetic head, the bent portion being provided between the gimbal portion and the attachment portion so that an elastic force used for pressing the magnetic head onto a magnetic disk is generated, the attachment portion being provided for mounting the spring arm to a rigid arm;

a conductive-pattern layer, formed on a surface of the spring arm, extending from the gimbal portion to the attachment portion; and a dispersing-pattern layer, formed on a surface of the bent portion, for dispersing a force exerted on the conductive-pattern layer during a bending process for the bent portion.

There is further provided, according to the present invention, a magnetic head unit used for a magnetic disk apparatus, the magnetic head unit comprising:

a magnetic head having a core slider and a magnetic head element;

a spring arm generating an elastic force for pressing the magnetic head onto a magnetic disk, the magnetic head being mounted on a first end of the spring arm, the spring arm being mounted on a member of the magnetic apparatus at a second end opposite to the first end, the member being grounded; and insulating means, provided between the magnetic head and the member of the magnetic disk apparatus, for providing a high electric resistance so that the magnetic head is electrically insulated from the member of the magnetic disk apparatus so as to prevent an electric discharge from being generated in the magnetic head element.

There is additionally provided, according to the present invention, a magnetic head unit used for a magnetic disk apparatus, the magnetic head unit comprising:

a magnetic head having a core slider and a magnetic head element;

a spring arm generating an elastic force for pressing the magnetic head onto a magnetic disk, the magnetic head being mounted on an end of the spring arm by adhesive; and means for preventing deformation of the core slider due to thermal expansion of the slider core while the magnetic head is in use, the deformation resulting in bending of the core slider.

Other objects features and advantages of the present invention will become more apparent from the following detailed description when read in conjunction with the accompanying drawings.

BRIEF DESCRIPTION OF THE DRAWINGS

FIG. 6A is a perspective view of the spring arm shown in FIG. 5A in a state where a magnetic head has not been mounted on a gimbal; FIGS. 6B-1 through 6B-6 are is an illustrations showing a process for forming conductive-pattern layers on the spring arm;

FIG. 18 is a perspective view of an essential part of a tenth embodiment of a magnetic head unit according to the present invention;

FIG. 19 is an exploded view of an eleventh embodiment of a magnetic head unit according to the present invention;

FIG. 20A is a perspective view of a spring arm of a twelfth embodiment of a magnetic head unit according to the present invention; FIG. 20B is an enlarged cross sectional view of a mounting structure of the core slider shown in FIG. 20A;

FIGS. 21A through 21F are illustrations of variations of the hole shown in FIG. 20A.

DETAILED DESCRIPTION OF THE PREFERRED EMBODIMENTS

A description will now be given, with reference to FIGS. 5A and 5B, of a first embodiment of the present invention.

Figure 1A:
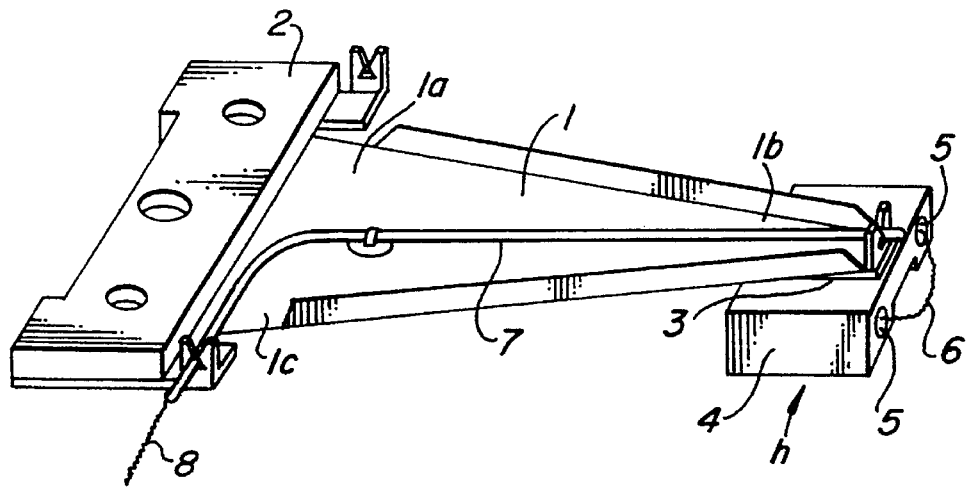
FIG. 1A is an exploded view of an example of a magnetic head unit having the thin-film type magnetic head used for the conventional magnetic disk apparatuses.
Figure 5A:
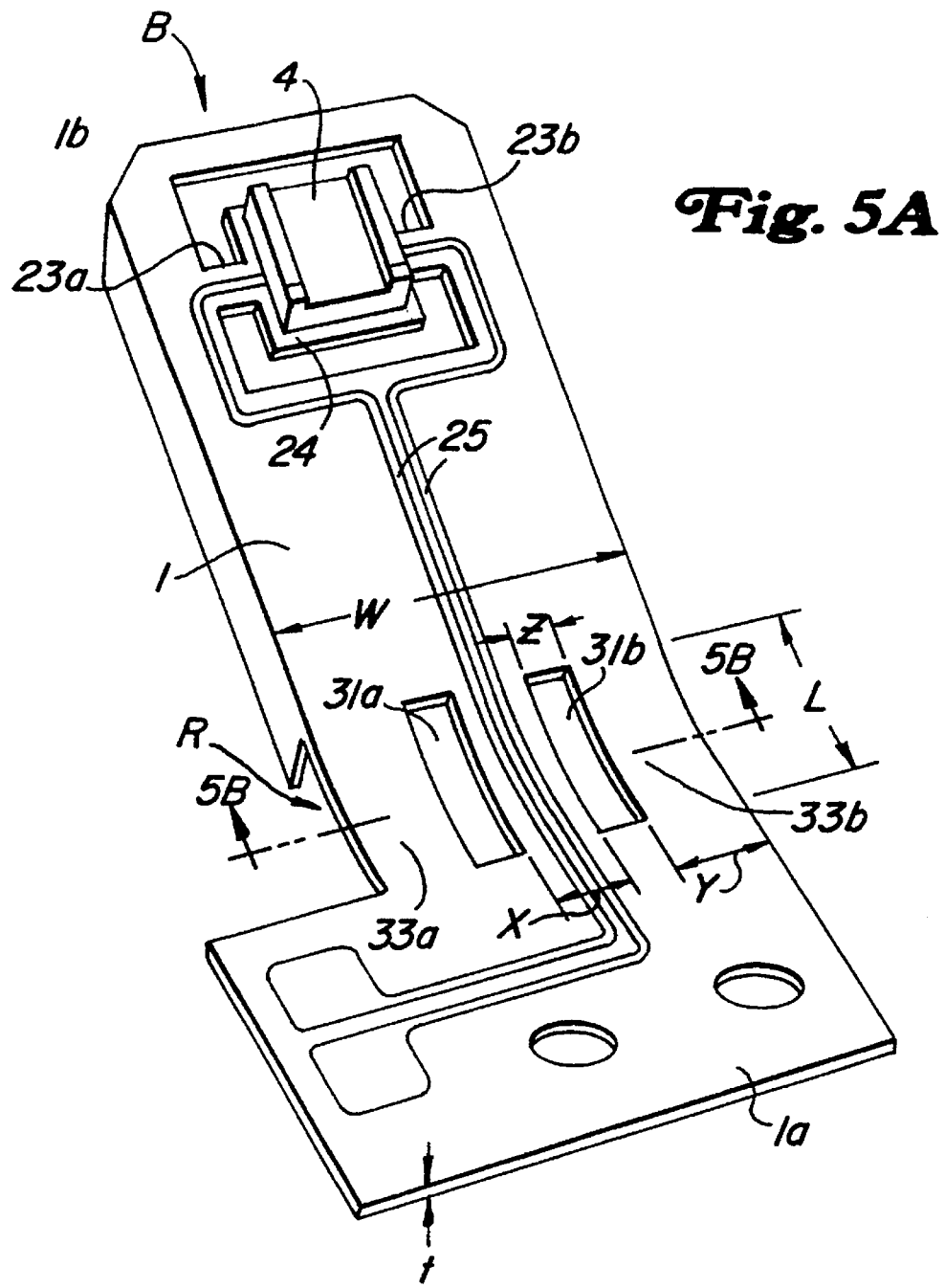
FIG. 5A is a perspective view of a first embodiment of a magnetic head unit according to the present invention.
Figure 5B:
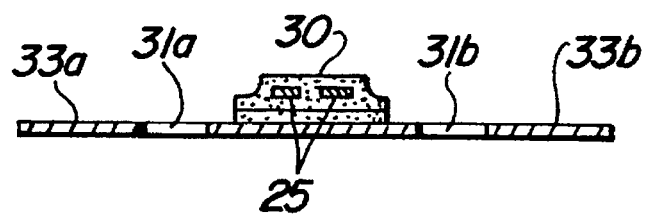
FIG. 5B is an enlarged cross sectional view taken along a line 5B—5B of FIG. 5A.

FIG. 5A is a perspective view of a first embodiment of a magnetic head unit according to the present invention, and FIG. 5B is an enlarged cross sectional view taken along a line 5B—5B of FIG. 5A. In FIGS. 5A and 5B, parts that are the same as the parts shown in FIG. 1A are given the same reference numerals, and descriptions thereof will be omitted.

The first embodiment according to the present invention comprises the spring arm 1 and the slider core 4 of the magnetic head. A gimbal 24 supported by bridge portions 23a and 23b is formed on the end 1b of the spring arm 1. The core slider 4 of the magnetic head is mounted on the gimbal 24 by adhesive.

The base portion (attachment portion) 1a of the spring arm 1 is fixed to a member of a magnetic head positioning mechanism. Conductive-pattern layers 25 run from the base portion 1a to the gimbal 24 so as to transmit signals to/from the magnetic head.

FIG. 6A is a perspective view of the spring arm 1 shown in FIG. 5A in a state where the magnetic head has not been mounted on the gimbal 24. In FIG. 6A, a portion of the core slider 4 is also shown to explain electrical connection between the magnetic head and the conductive-pattern layers 25. A pad 25a is formed at the end of each of the two conductive-pattern layers 25. The core slider of the magnetic head is also provided with pads 26. When the core slider 4 is mounted on the gimbal 24, the pads 26 make contact with the respective pads 25a. The pads 26 and the pads 25a are then soldered together to assure an electric connection. It should be noted that the core slider 4 in FIG. 6A is viewed from a direction indicated by an arrow B of FIG. 5A.

Figure 2:
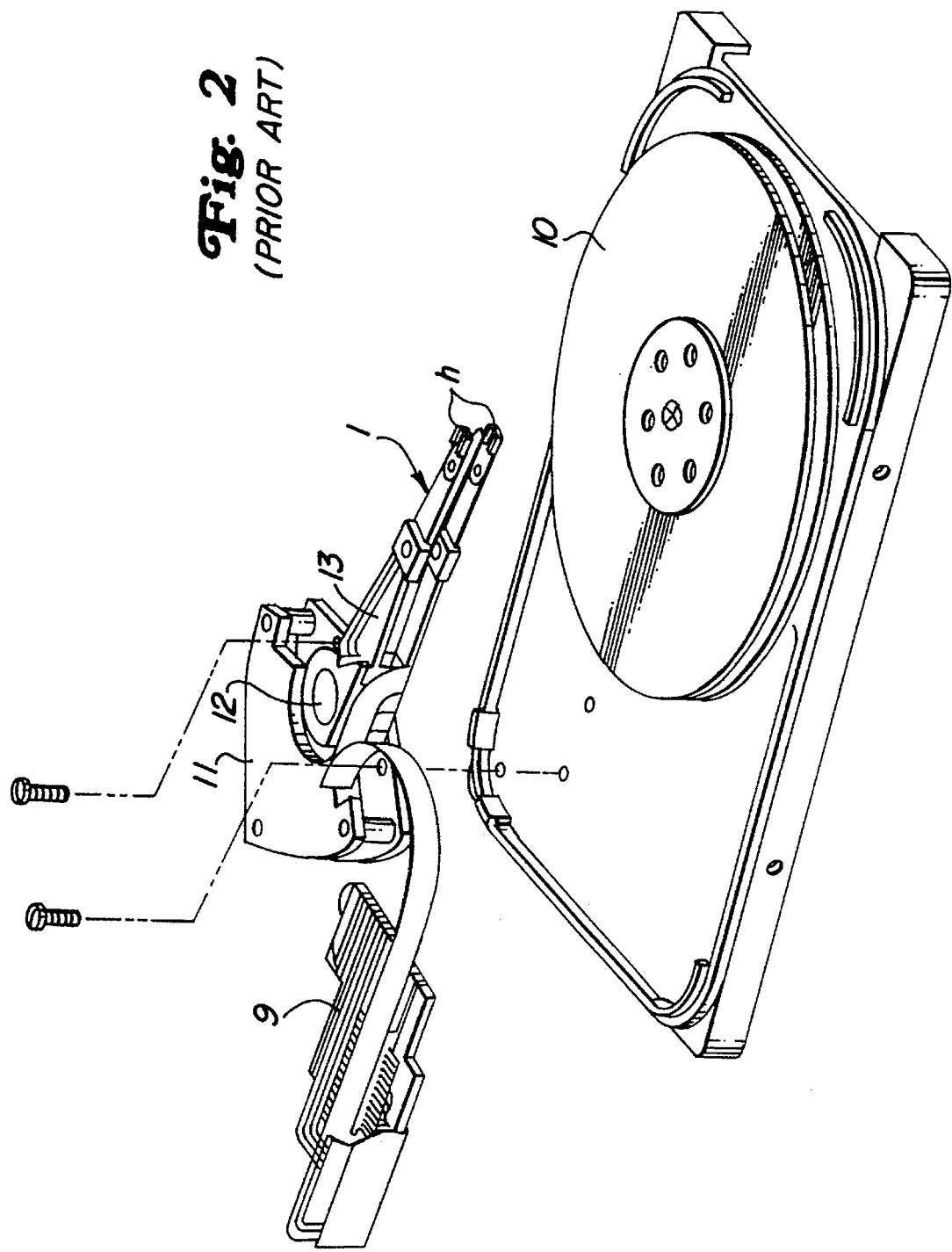
FIG. 2 is an exploded view of a conventional magnetic disk apparatus in which two magnetic head units shown in FIG. 1A are used.
Figure 3:
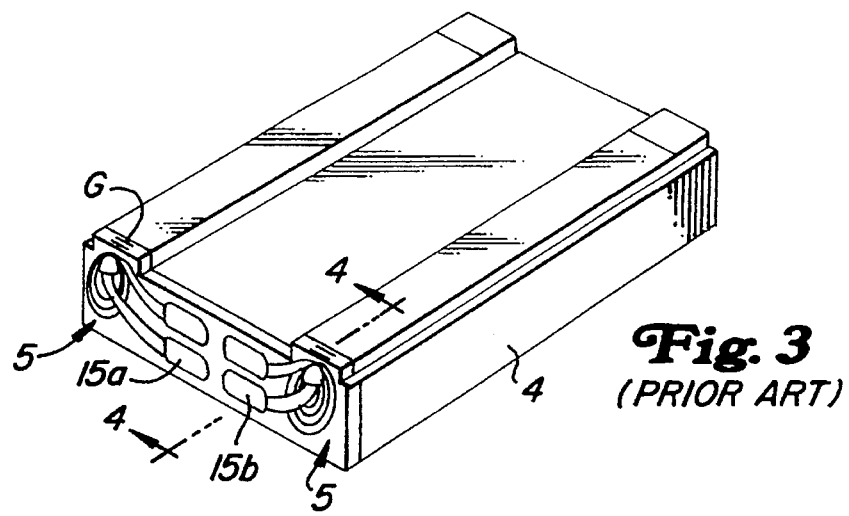
FIG. 3 is a perspective view of a thin-film type magnetic head.

The conductive-pattern layers 25 on the spring arm 1 are formed by a process shown in FIG. 6B. As shown by FIG. 6B-2, an insulating layer 27 is formed on the spring arm 1 by applying a polyimide resin over the spring arm 1 made of stainless steel. The thickness of the spring arm 1 is about 25 μm, and the thickness of the insulating layer 27 is 3–4 μm. A base layer 28 is then formed on the insulating layer 27, as shown in FIG. 6B-3, by sputtering copper (Cu) onto the insulating layer 27. The base layer 28 may instead be formed by vapor deposition or chemical plating.

Figure 4:
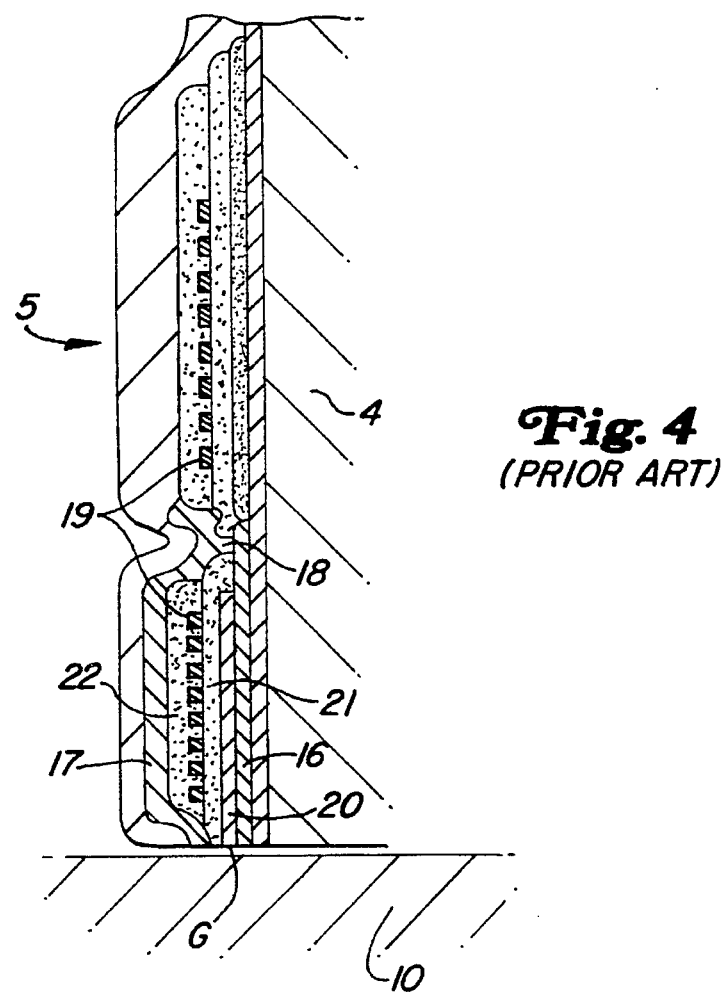
FIG. 4 is an enlarged cross sectional view of the thin-film type magnetic head shown in FIG. 3 taken along a line 4—4 of FIG. 3.

Using the base layer 28, electro plating is performed to form a copper layer 29 on the base layer 28, as shown in FIG. 6B-4. As shown in FIG. 6B-5, the base layer 28 and the copper layer 29 are etched so that the conductive-pattern layers 25 remain on the spring arm 1. Lastly, polyimide resin is applied over the conductive-pattern layers 25 so as to form an insulating film 30 which covers the conductive-pattern layers 25 to protect them.

If a bending process is performed by applying a pressing force to the conductive-pattern layers 25 formed on the spring arm 1, the conductive-pattern layers 25 may be damaged or destroyed. In order to eliminate this problem, in the first embodiment of the present invention, rectangular holes 31a and 31b are formed on the spring arm 1, as shown in FIG. 5A, on either side of the conductive-pattern layers 25. The rectangular holes 31a and 31b separate a portion of the spring arm 1, on which the conductive-pattern layers 25 are formed, from bent portions 33a and 33b to which a pressing force is applied to bend the spring arm 1. The rectangular holes 31a and 31b may instead be slits 32a and 32b as shown in FIG. 6A.

Figure 7A:
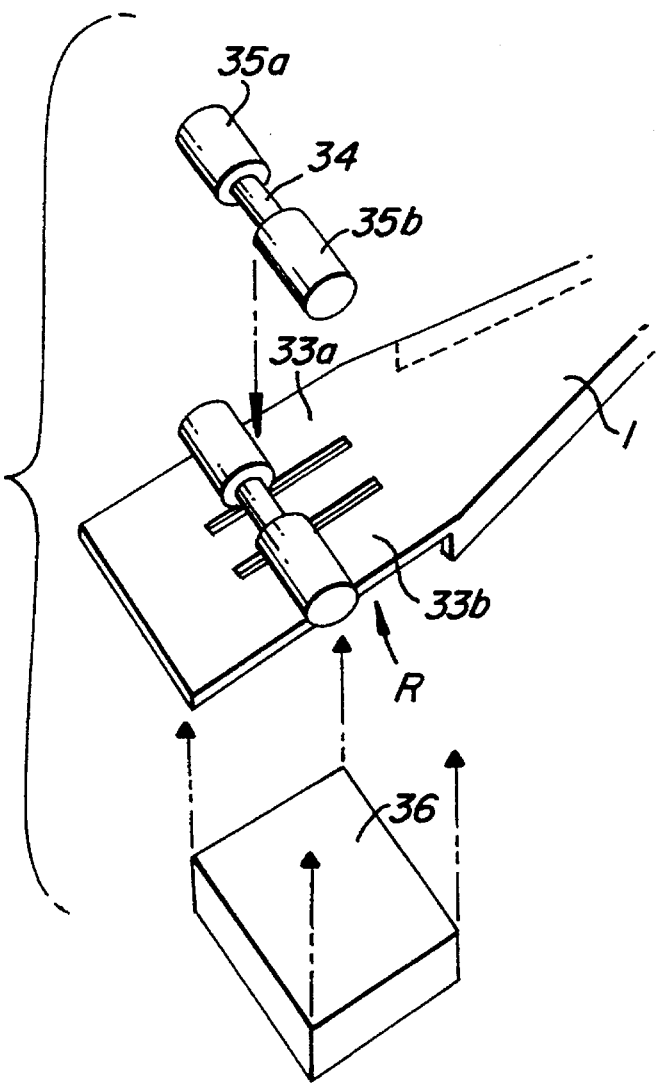
FIGS. 7A through 7C are illustrations showing a process for bending the bent portions shown in FIG. 6A.
Figure 7B:
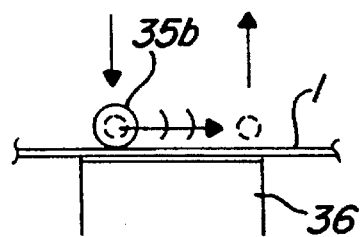
Figure 7C:
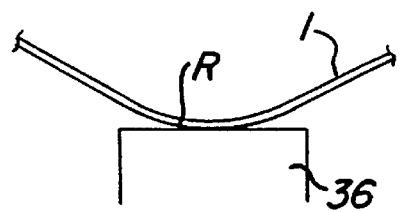

FIGS. 7A through 7C are illustrations showing a process for bending the bent portions 33a and 33b. As shown in FIG. 7A, first a roller 34 having larger diameter portions 35a and 35b is prepared. The larger diameter portions 35a and 35b bend the corresponding bent portions 33a and 33b. The bent portions 33a and 33b, which are formed as an elastic portion R generating an elastic force, of spring arm 1 are placed on a rubber table 36. The roller 34 is then rolled, as shown in FIG. 7B, on the bent portion 33a and 33b while it is being pressed. As a result, only the bent portions 33a and 33b are permanently deformed into an arc-like shape, while the portion of the spring arm 1, on which portion the conductive-pattern layers are formed, between the bent portions 33a and 33b is elastically deformed.

According to the present embodiment, the roller 34 is not pressed on the portion where the conductive-pattern layers 25 have been formed, and thus no damage to the conductive-pattern layers 25 occurs.

Figure 8A:
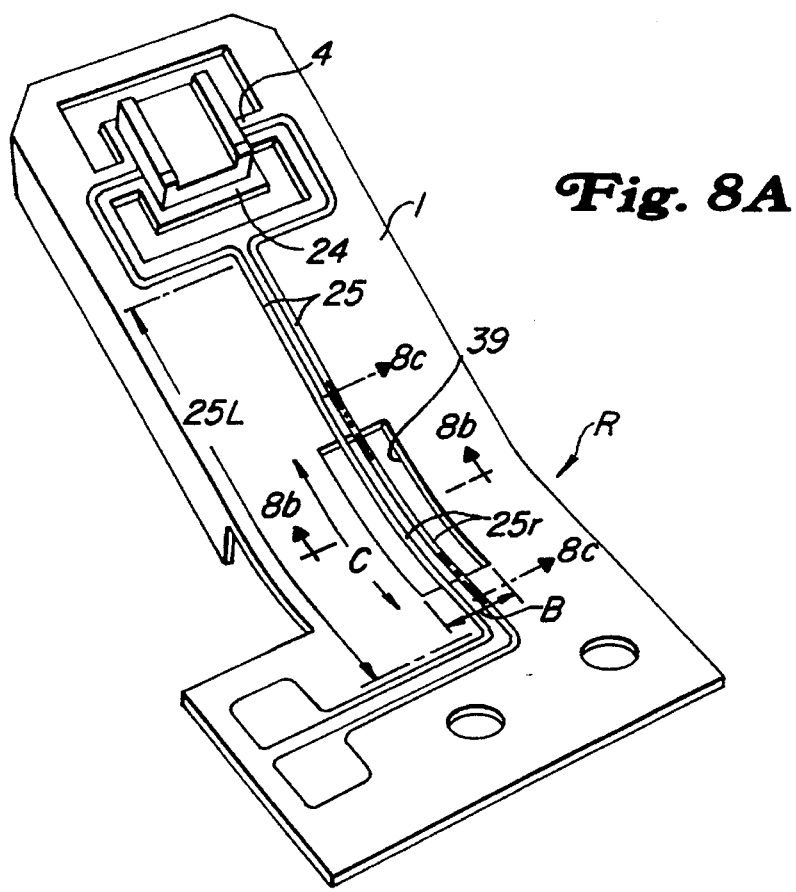
FIG. 8A is a perspective view of a second embodiment of a magnetic head unit according to the present invention.
Figure 8B:
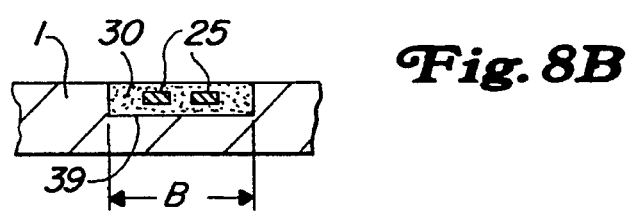
FIG. 8B is an enlarged partial cross sectional view taken along a line 8B—8B of FIG. 8A.
Figure 8C:
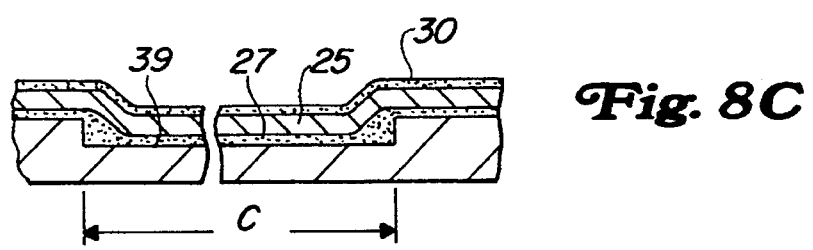
FIG. 8C is an enlarged partial cross sectional view taken along a line 8C—8C of FIG. 8A.
Figure 8D:
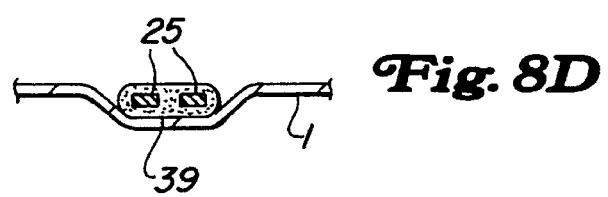
FIG. 8D is a partial cross sectional view of a variation of the spring arm shown in FIG. 8A.

A description will now be given, with reference to FIGS. 8A through 8D, of a second embodiment according to the present invention. FIG. 8A is a perspective view of a second embodiment of a magnetic head unit according to the present invention; FIG. 8B is an enlarged partial cross sectional view taken along a line 8B—8B of FIG. 8A; FIG. 8C is an enlarged partial cross sectional view taken along a line 8C—8C of FIG. 8A. FIG. 8D is a partial cross sectional view of a variation of the spring arm shown in FIG. 8A.

In the present embodiment, a recessed portion 39 is formed in the elastic portion R where an elastic force is generated. The conductive-pattern layers 25 are formed in the recessed portion 39. The recessed portion 39 covers an entire length C of the elastic portion R and a width B so as to cover the portions of the conductive-pattern layers 25 located in the elastic portion R of the spring arm 1.

In this embodiment, a portion of the insulating layer 27 shown in FIG. 6B-2 is formed also inside the recessed portion 39. The base layer 28 and the copper layer 29 are then formed on the entire surface of the insulating layer 27 including the portion thereof inside the recessed portion 39 so as to form the conductive-pattern layers 25. Lastly, the insulating layer 30 is formed on the conductive-pattern layers 25 so that a top surface of the insulating layer 30 located inside the recessed portion 39 is below the surface of the spring arm 1 as shown in FIG. 8B.

In the present invention, since the portion inside the recessed portion 39 do not come into contact with the roller for forming the bent portions even though the roller has a straight cylindrical surface, no damage occurs to the conductive-pattern layers 25, the same as in the case of the above-mentioned first embodiment.

Although in the above embodiment the recessed portion 39 is formed by means of etching, the recessed portion 39 may instead be formed by means of press forming as shown in FIG. 8D. By using press forming, the recessed portion 39 can be formed even if the thickness of the spring arm 1 is very slight or the total thickness of the insulating layers 27 and 30 and the conductive-pattern layers 25 is great. The recessed portion 39 may be formed so that an entire length 25L of straight portions of the conductive-pattern layers 25 is embedded in the recessed portion 39.

Figure 9A:
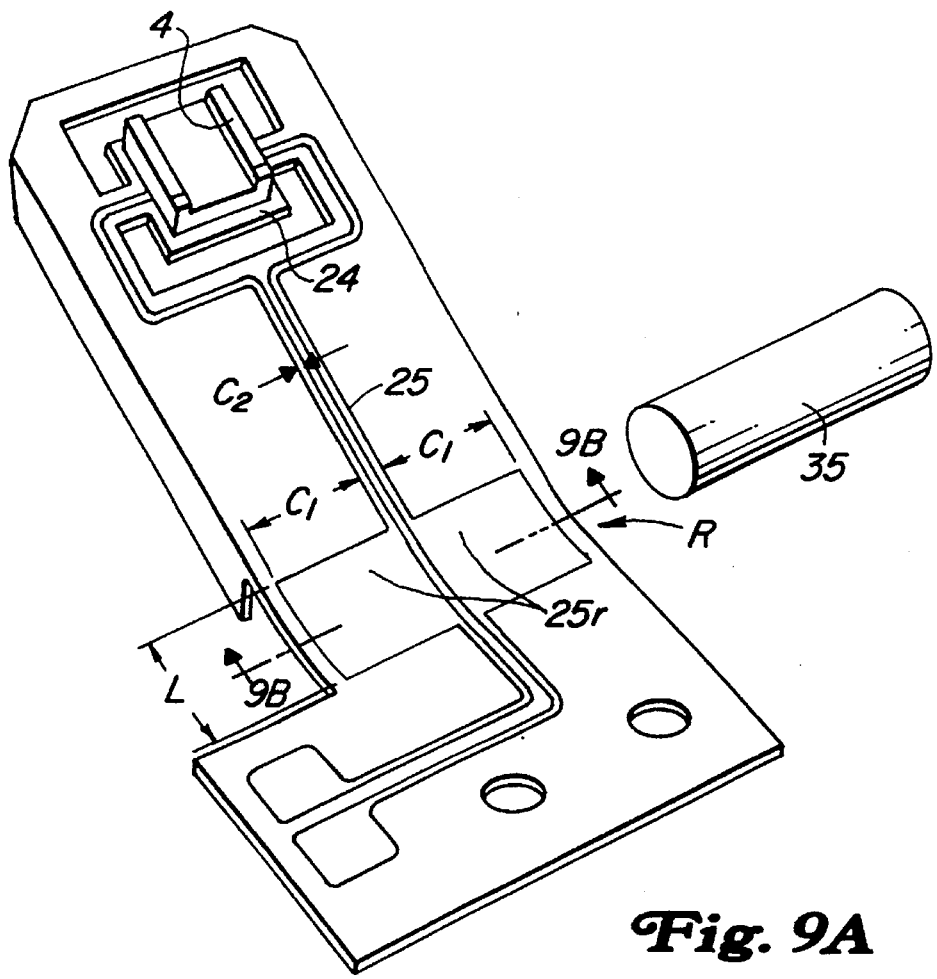
FIG. 9A is a perspective view of a third embodiment of a magnetic head unit according to the present invention.
Figure 9B:
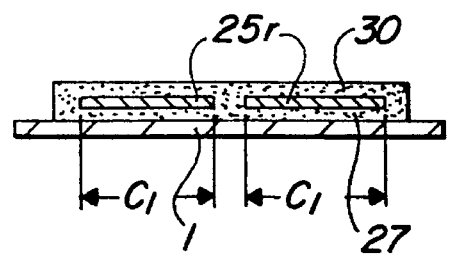
FIG. 9B is a cross sectional view taken along a line 9B—9B of FIG. 9A.

A description will now be given, with reference to FIGS. 9A and 9B, of a third embodiment according to the present invention. FIG. 9A is a perspective view of a third embodiment of a magnetic head unit according to the present invention; FIG. 9B is a cross sectional view taken along a line 9B—9B of FIG. 9A.

In the present embodiment, portions 25r of the conductive-pattern layers 25, corresponding to the elastic portion R which generates an elastic force, are wider than other portions of the conductive-pattern layers 25. That is, a width $C_1$ of each of the portion 25r of the conductive-pattern layers 25 within the elastic portion R is widened over a length L corresponding to the elastic portion R. The total thickness of the conductive-pattern layers 25 and insulating layers 27 and 30 is uniform over the entire width of the widened portions 25r of the conductive-pattern layers 25. A roller 35 having a straight cylindrical surface is pressed over the entire width of the elastic portion R so as to bend the elastic portion R.

If the conductive-pattern layers 25 or the insulating layer 30 in the elastic portion R are protruded as shown in FIG. 6B, the pressing force exerted by the roller 35 is concentrated onto the conductive-pattern layers 25. However, in the present embodiment, the pressing force is dispersed onto the entire width of the widened conductive-pattern layers 25, and thus damage or breakage of the conductive-pattern layers 25 is prevented. Additionally, even if damage such as a cracking of portions of the conductive-pattern layers 25 occurs, other portions of the layers 25 which are not damaged, resulting in reliable electric continuity. In the present embodiment, the width cl of each of the portion 25r of the conductive-pattern layers 25 is 2.0 mm, and the length L is 1.5 mm.

Figure 10:
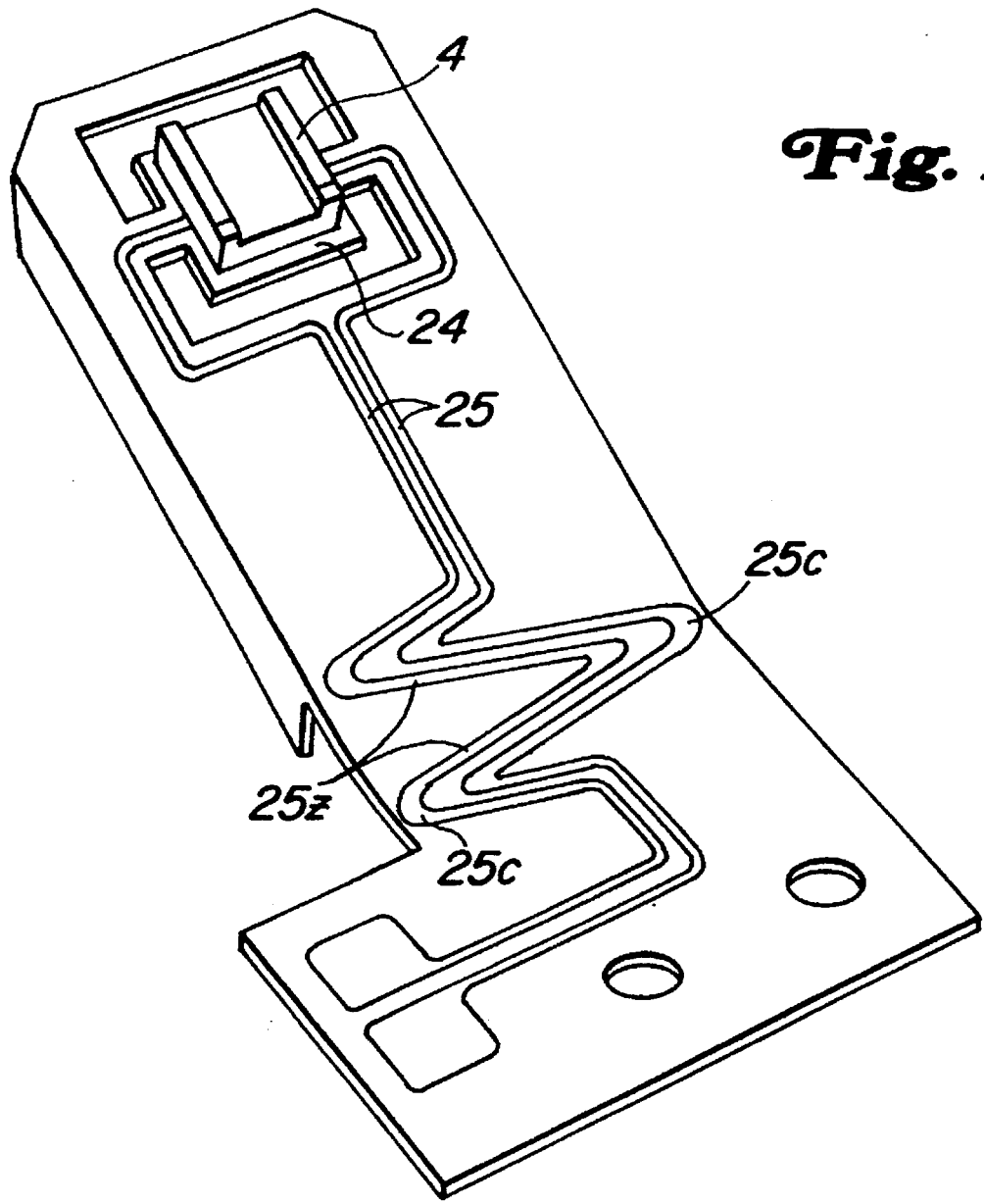
FIG. 10 is a perspective view of a fourth embodiment of a magnetic head unit according to the present invention.

A description will now be given, with reference to FIG. 10, of a fourth embodiment according to the present invention. FIG. 10 is a perspective view of a fourth embodiment of a magnetic head unit according to the present invention.

In the present embodiment, zigzagging conductive-pattern portions 25z of the conductive-pattern layers 25 within the elastic portion R are formed to extend in a direction oblique to a direction in which other portions of the conductive-pattern layers 25 extend. Preferably, U-turn portions 25c are formed with a width greater than other portions. As a result, in the present embodiment, pressing force is dispersed over the contacting area of the roller to be pressed, thus reducing damaging and breakage of the conductive-pattern layers 25.

Figure 11A:
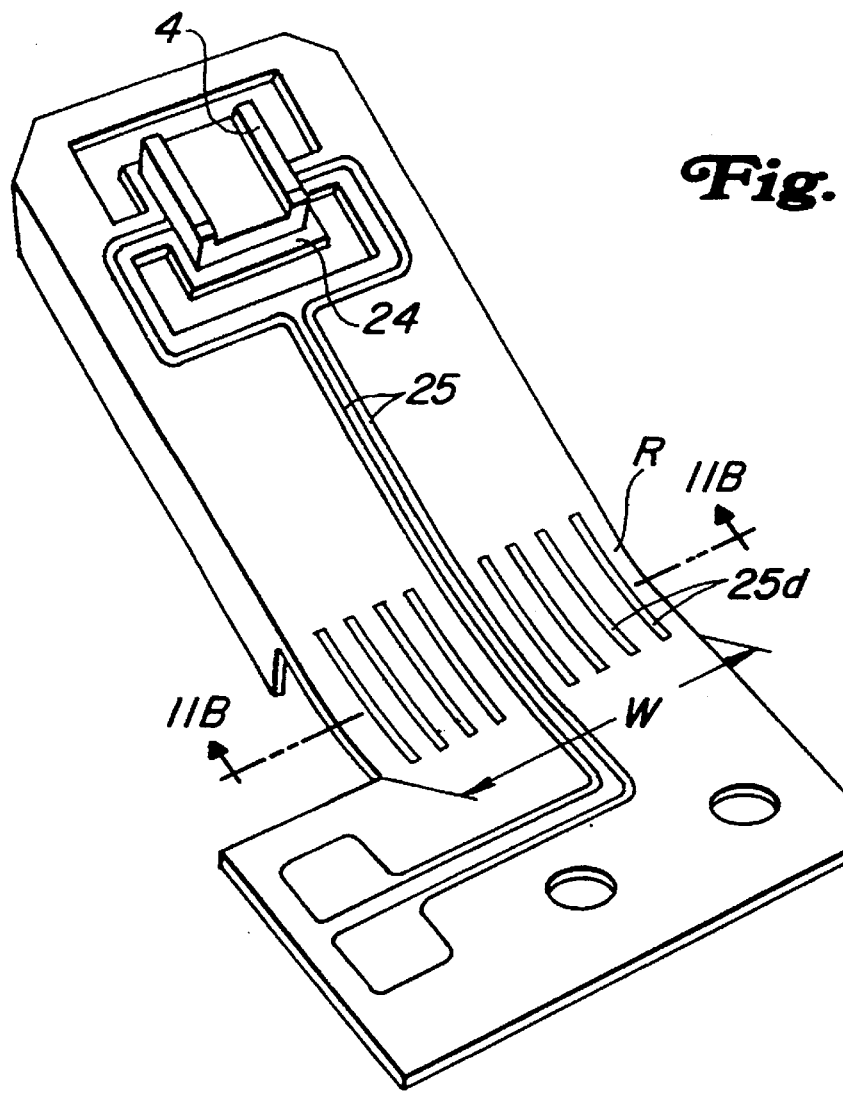
FIG. 11A is a perspective view of a fifth embodiment of a magnetic head unit according to the present invention.
Figure 11B:
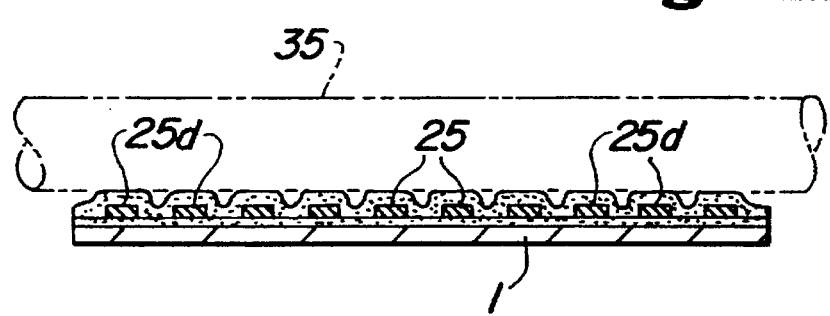
FIG. 11B is an enlarged partial cross sectional view taken along a line 11B—11B of FIG. 11A.

A description will now be given, with reference to FIGS. 11A and 11B, of a fifth embodiment of the present invention. FIG. 11A is a perspective view of a fourth embodiment of a magnetic head unit according to the present invention; FIG. 11B is an enlarged partial cross sectional view taken along a line 11B—11B of FIG. 11A.

In the present embodiment, a plurality of dummy patterns 25d are formed within the elastic portion R. The dummy patterns 25d have the same construction as the conductive-pattern layers 25. When the elastic portion R is pressed by the roller 35 as shown in FIG. 11B, the pressing force is dispersed onto the dummy patterns 25d, and thus damage and breakage of the conductive-pattern layers 25 is prevented unlike in the case of the conventional conductive-pattern layers in which the pressing force is concentrated onto the conductive-pattern layers.

Figure 12A:
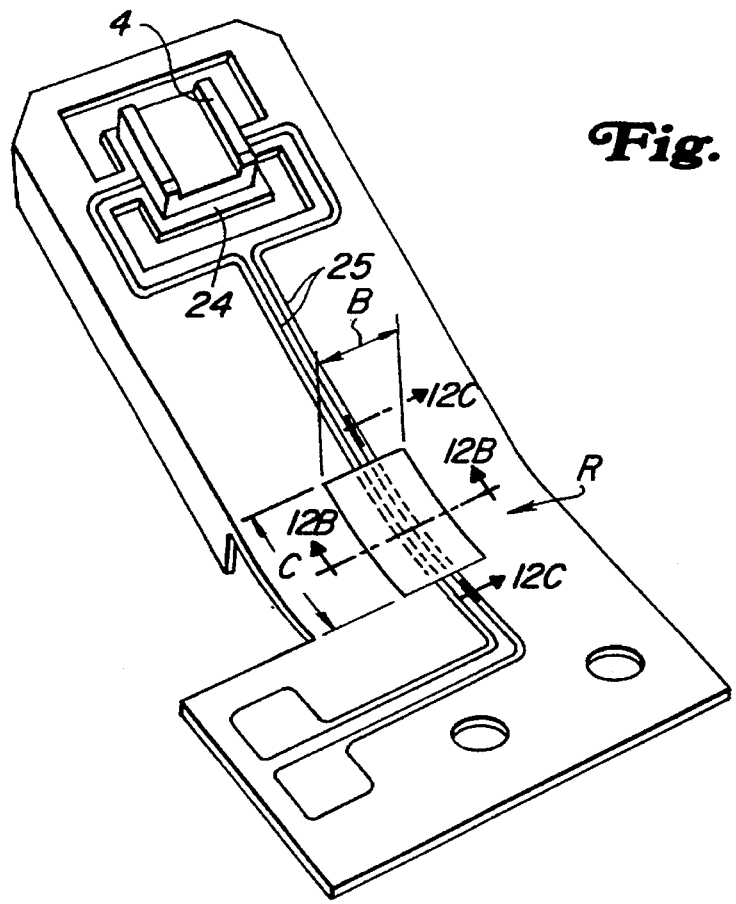
FIG. 12A is a perspective view of a sixth embodiment of a magnetic head unit according to the preset invention.
Figure 12B:
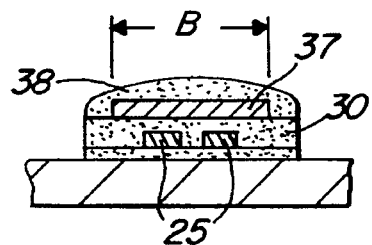
FIG. 12B is an enlarged partial cross sectional view taken along a line 12B—12B of FIG. 12A.
Figure 12C:
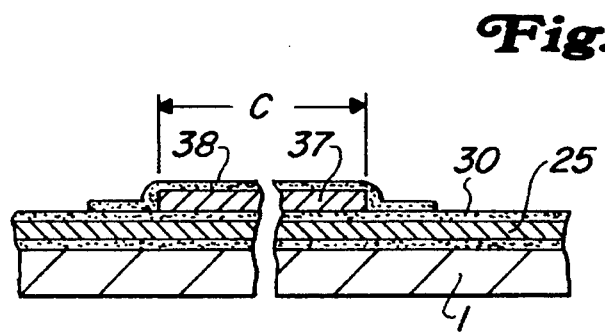
FIG. 12C is an enlarged partial cross sectional view taken along a line 12C—12C of FIG. 12C.

FIG. 12A is a perspective view of a sixth embodiment of a magnetic head unit according to the preset invention; FIG. 12B is an enlarged partial cross sectional view taken along a line 12B—12B of FIG. 12A; FIG. 12C is an enlarged partial cross sectional view taken along a line 12C—12C of FIG. 12C. In the sixth embodiment, a protecting layer is formed over portions of the conductive-pattern layers 25 in the elastic portion R. The protecting layer comprises a conducting layer 37 and an insulating layer 38.

In order to make the present embodiment, a copper base layer is formed on the insulating layer 30 in the process shown in FIG. 6B-3-6. The conductive layer 37 made of copper is then formed by means of electro plating, and the layer 37 is patterned. Polyimide resin is coated over the conductive layer 37 so as to form the insulating layer 38.

Preferably, the insulating layer 30 formed over the conductive-pattern layers 25 is formed with a relatively great thickness so that the insulating layer 30 can be flattened and smoothed by means of surface polishing. The conductive layer 37 has a relatively large width B to cover the conductive-pattern layers 25, and has a length C which covers the length of the elastic portion R as shown in FIG. 12A.

In the present embodiment, the roller 35 exerts a pressing force onto the conductive layer 37 which has a relatively high strength, and thus the pressing force is uniformly dispersed onto the conductive layer 37. Accordingly, damage to the conductive-pattern layers 25 is prevented when the spring arm 1 is bent by the roller 35.

Figure 13B:
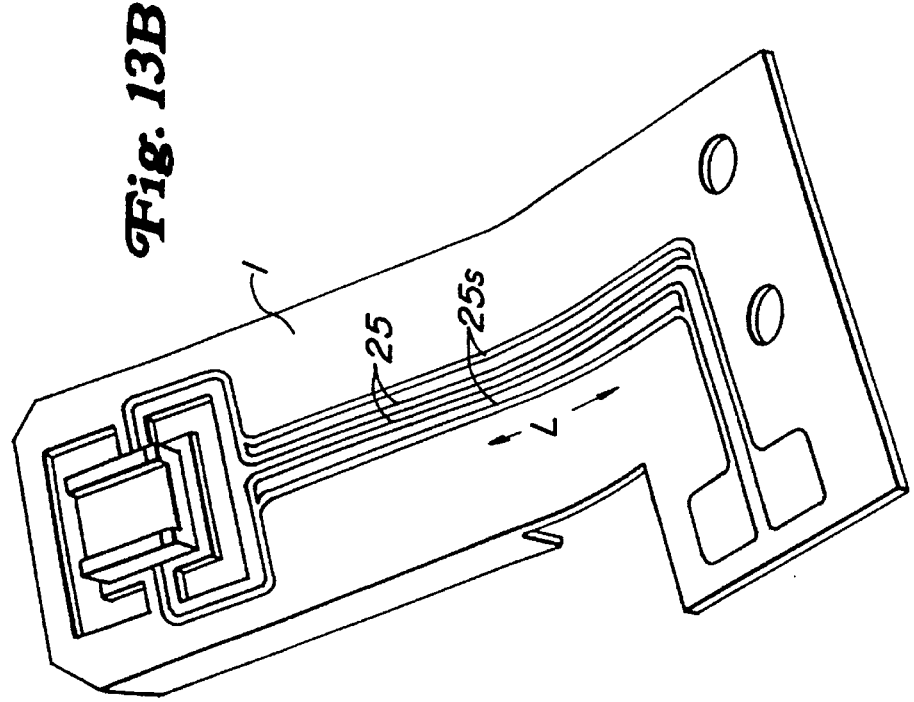
FIG. 13B is a variation of the embodiment shown in FIG. 13A.
Figure 13A:
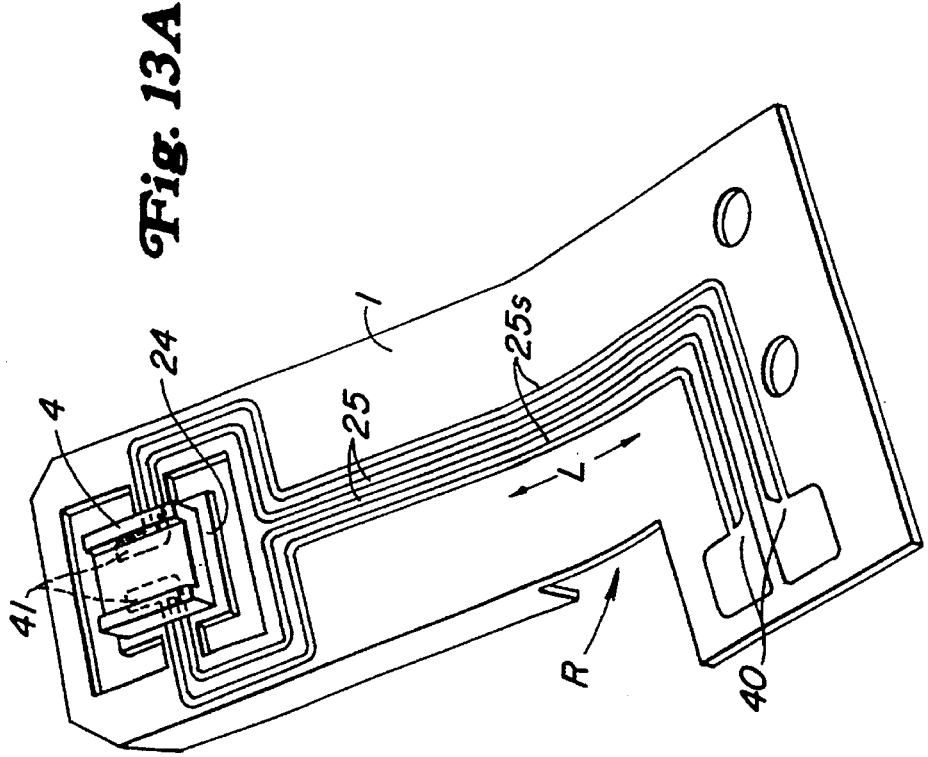
FIG. 13A is a perspective view of a seventh embodiment of a magnetic head unit according to the present invention.

FIG. 13A is a perspective view of a seventh embodiment of a magnetic head unit according to the present invention. In the seventh embodiment, extra conductive-pattern layers 25s are formed. The extra conductive-pattern layers 25s are formed along each of the conductive layers 25. Both ends of each of the additional conductive-pattern layers 25s are connected to the ends of the respective conductive-pattern layers 25 at corresponding connection parts 40 and 41. Accordingly, if one of the conductive-pattern layers 25 is damaged to lose continuity, the corresponding extra conductive-pattern layer 25s serves the same function as the damaged conductive-pattern layer 25. Therefore, a reliable connection can be realized.

FIG. 13B is a variation of the seventh embodiment according to the present invention. In this variation, each of the conductive-pattern layers 25 has two paths along the straight portion thereof within the elastic portion R. One of the paths serves as the extra conductive-pattern layer 25s.

In all the above-mentioned embodiments and variations thereof, although the bent portions are formed by a press method using a roller, other method using a mold press or laser may be used.

Since the spring arm 1 according to the above-mentioned embodiments is mounted on a member of the magnetic head positioning mechanism, as shown in FIG. 2, the magnetic disk apparatus can reliably transmit recording/reproducing signals through the spring arm.

Figure 14:
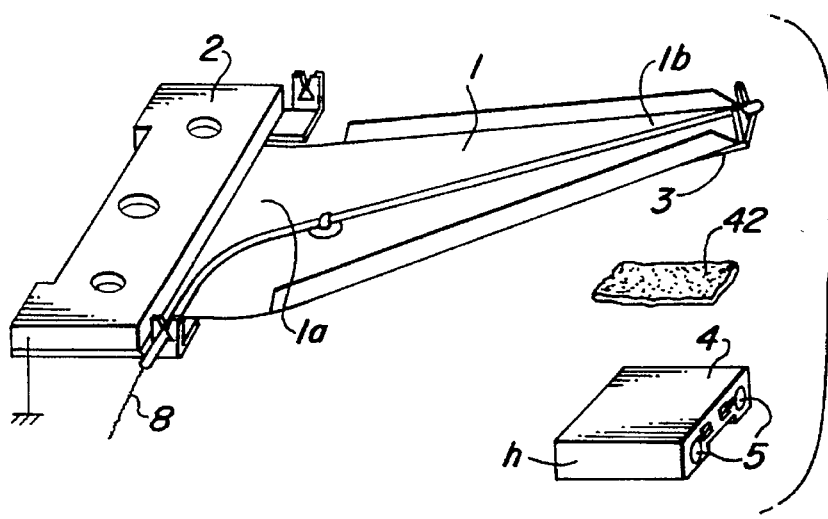
FIG. 14 is a perspective view of an eighth embodiment of a magnetic head unit according to the present invention.
Figure 15A:
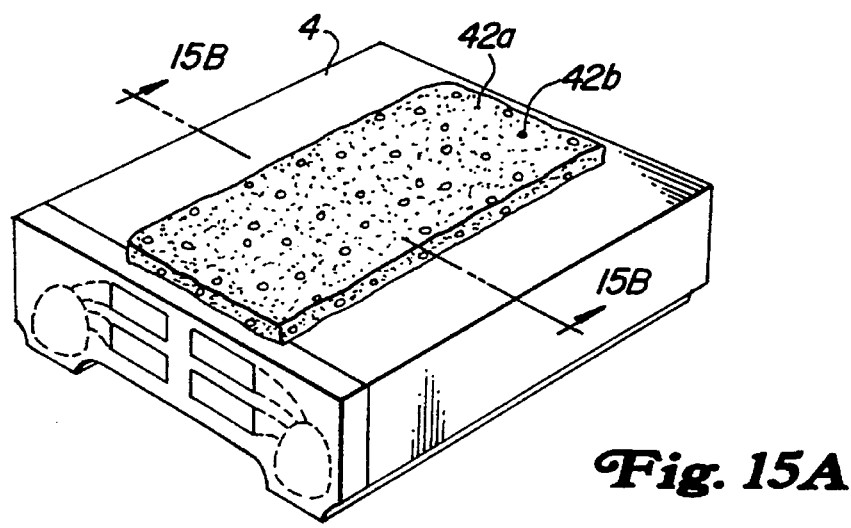
FIG. 15A is a perspective view of the magnetic head shown in FIG. 14.
Figure 15B:
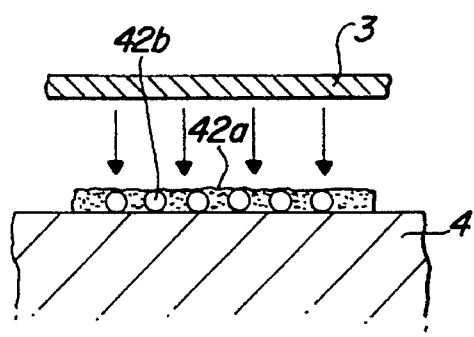
FIG. 15B is a cross sectional view taken along a line 15B—15B of FIG. 15A.

A description will now be given, with reference to FIG. 14 and FIG. 15A and 15B, of an eighth embodiment according to the present invention. FIG. 14 is a perspective view of the eighth embodiment of a magnetic head unit according to the present invention. In FIG. 14, parts that are the same as the parts shown in FIG. 1A are given the same reference numerals, and descriptions thereof will be omitted. FIG. 15A is a perspective view of the magnetic head h shown in FIG. 14; FIG. 15B is a cross sectional view taken along a line 15B—15B of FIG. 15A.

In the eighth embodiment according to the present invention, the core slider 4 is mounted on the gimbal 3 by adhesive 42 having a high insulating effect. The core slider 4 may instead be directly mounted on the end 1b of the spring arm 1. Although, in the prior art, the core slider is also mounted by adhesive having an insulating effect, the electric resistance between the core slider 4 and the gimbal 3 is low because the adhesive layer is very thin. Accordingly, the core slider 4 may be at the same potential, that is a ground potential, as the spring arm 1 because the spring arm 1 is grounded. If a high voltage static electricity is generated in the thin-film coil of the magnetic head element 5, the insulating layer between the thin-film coil and the magnetic pole is damaged, resulting in electric discharge between the thin-film coil and the core slider.

In the eighth embodiment, in order to obtain a high resistance between the core slider and the gimbal 3, a thick layer of the adhesive 42 is provided. It is preferable that the adhesive 42 be a UV cure resin (ultra-violet cure type adhesive). Alternatively, epoxy resin may be used. In the present embodiment, as shown in FIG. 15A, the adhesive 42 comprises an insulating material powder 42b mixed in adhesive medium 42a. Accordingly, the adhesive 42 can have a high electric resistance, and is formed with a relatively great thickness, and thus the insulation between the core slider 4 and the gimbal 3 is improved.

Figure 16:
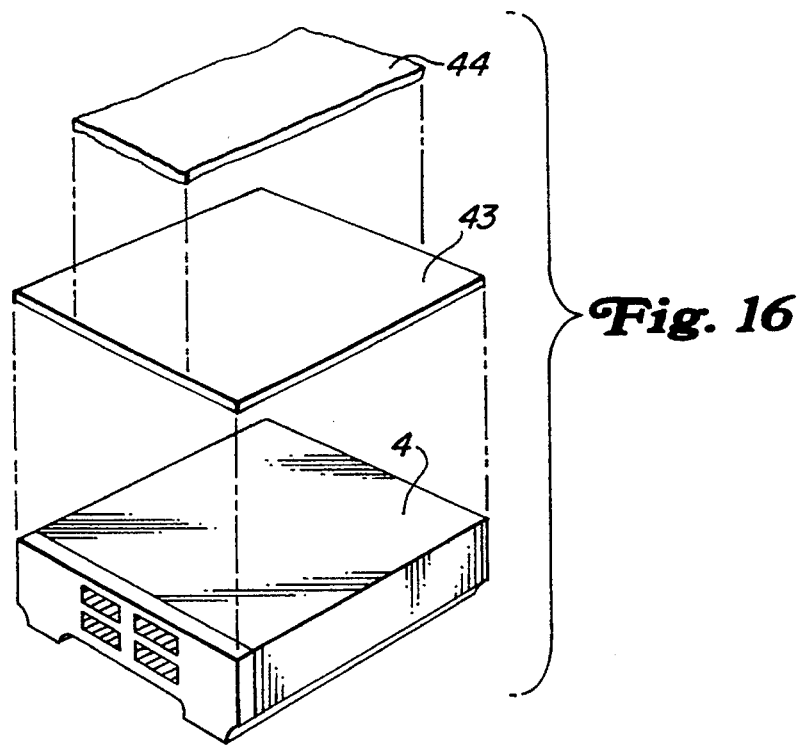
FIG. 16 is an exploded view of an essential part of a ninth embodiment of a magnetic head unit according to the present invention.
Figure 17:
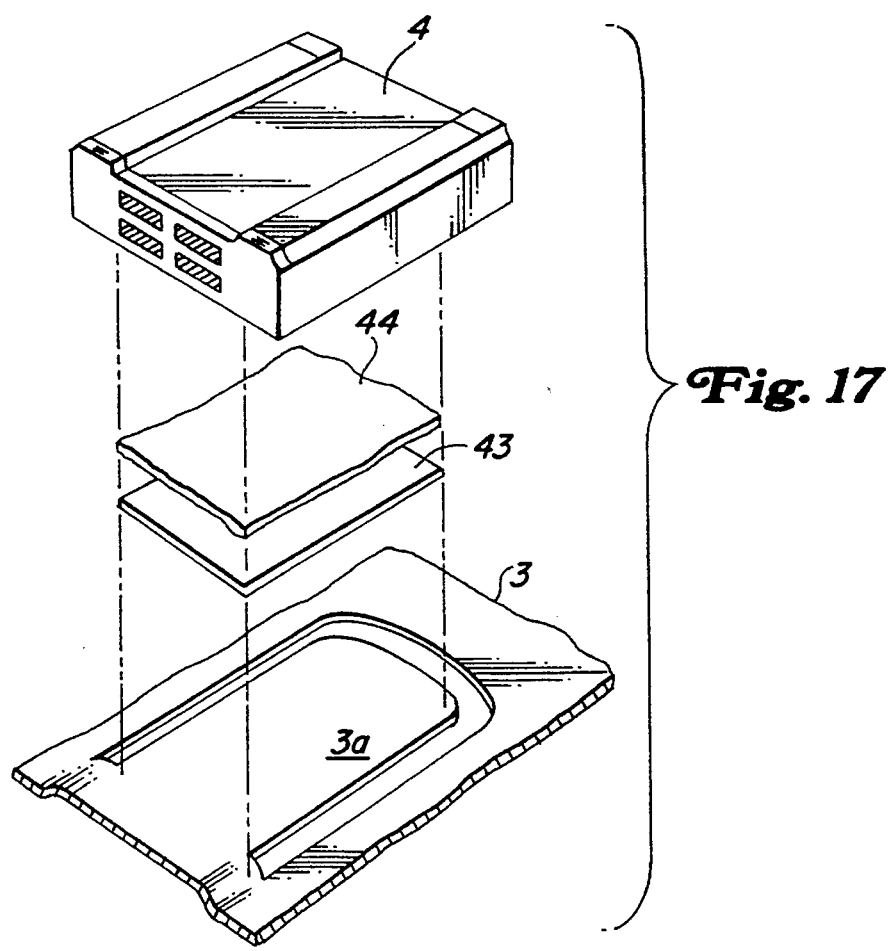
FIG. 17 is an exploded view of an essential part of a variation of the ninth embodiment shown in FIG. 16.

FIG. 16 is an exploded view of an essential part of a ninth embodiment of a magnetic head unit according to the present invention. In the ninth embodiment, the core slider 4 is mounted on the gimbal 3 or the end 1b of the spring arm 1 via an insulator 43. In the present embodiment, the insulator 43 is formed by applying insulating resin such as a photoresist onto a surface of the core slider 4. The core slider is mounted on the gimbal 3 by applying adhesive 44 onto the insulator 43. Alternatively, as shown in FIG. 17, the insulator 43 may be applied onto a mounting surface of the gimbal 3.

FIG. 18 is a perspective view of an essential part of a tenth embodiment according to the present invention. In FIG. 18, a magnetic head comprising the magnetic head elements 5 and a core slider 4i is shown. Unlike the conventional magnetic head, the core slider 4i is made of an insulating material such as $SiO_2$. Accordingly, the discharge as described in relation to the conventional magnetic head can be eliminated.

FIG. 19 is an exploded view of an eleventh embodiment of a magnetic head unit according to the present invention. In the present embodiment, the magnetic head unit is mounted on a driving arm 13 of the magnetic head driving mechanism via an insulating member 45. The insulating member has screw holes 46 into which screws for fastening the magnetic head unit to the driving arm 13 are inserted. The screws are made of synthetic resin or metal screws covered with synthetic resin. Accordingly, the spring arm 1 is insulated from the driving arm 13, which may be grounded. Alternatively, the spacer 2 may be made of an insulating material.

In the present embodiment, since the spring arm is not electrically connected to the driving arm 13, which may be grounded, no electric discharge occurs between the core slider 4 and the magnetic pole.

FIG. 20A is a perspective view of a spring arm of a twelfth embodiment of a magnetic head unit according to the present invention; FIG. 20B is an enlarged cross sectional view showing a mounting structure of the core slider shown in FIG. 20A. In the present embodiment, a gimbal 24 formed on the spring arm 1 has a hole 47 in the center thereof. As shown in FIG. 20B, the core slider 4 is mounted on the gimbal 24 by adhesive 48 so that the hole 47 is filled with the adhesive 48. Since the hole is formed in the gimbal 24, the gimbal can be easily bent, if bending stress is applied to the gimbal 24 due to a difference in thermal expansion between the core slider and the gimbal 24. Accordingly, bending stress applied to the core slider 4 is reduced since the gimbal 24 is bent instead of the core slider 4. This feature is important when a thin and miniaturized core slider is used.

Variations of the hole 47 are shown in FIGS. 21A through 21F. A plurality of holes 47 may be provided, and each hole may have a rectangular shape.

In the present embodiment, the hole 47 is filled with a part of the adhesive applied between the core slider 4 and the gimbal 24, so that the strength of the adhesion between the core slider 4 and the gimbal 24 is increased. Additionally, if the UV cure resin is used, an ultra-violet beam can be irradiated through the hole 47, which effectively cures the UV cure resin, and thus the strength of the cured UV cure resin can be improved.

Figure 1B:
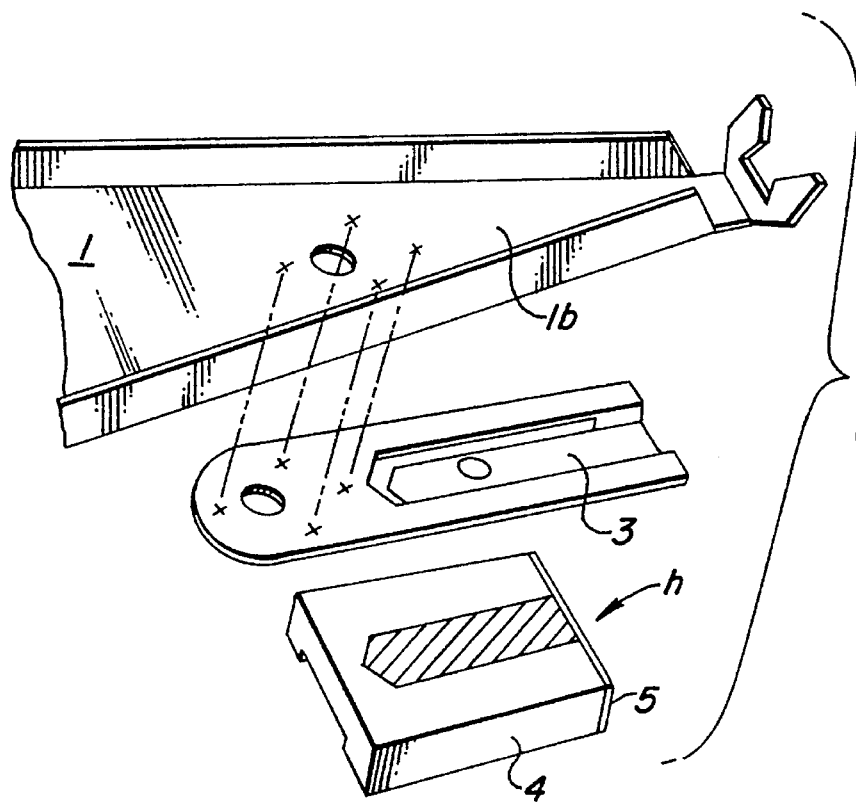
FIG. 1B is an exploded view of a part of the magnetic head unit shown in FIG. 1A.

It should be noted that although the gimbal 24 is integrally formed with the spring arm 1, the gimbal 24 may be formed separately from the spring arm 1; that is, it may be fixed to the spring arm 1 by means of welding described in regard to the conventional magnetic head unit shown in FIG. 1B.

Figure 22A:
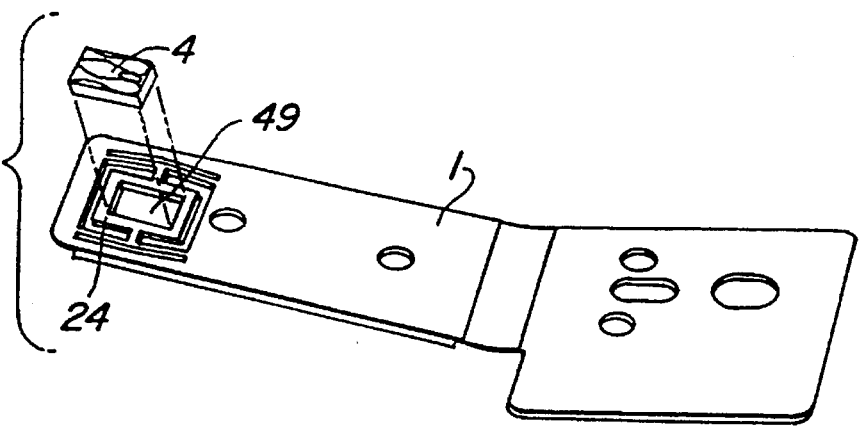
FIG. 22A is a perspective view of a spring arm of a thirteenth embodiment of a magnetic head unit according to the present invention.
Figure 22B:
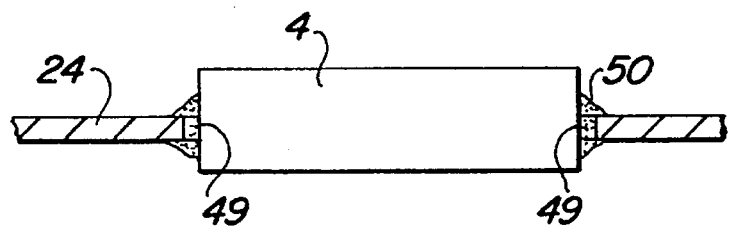
FIG. 22B is an enlarged cross sectional view of a mounting structure of the core slider shown in FIG. 22A.
Figure 22C:
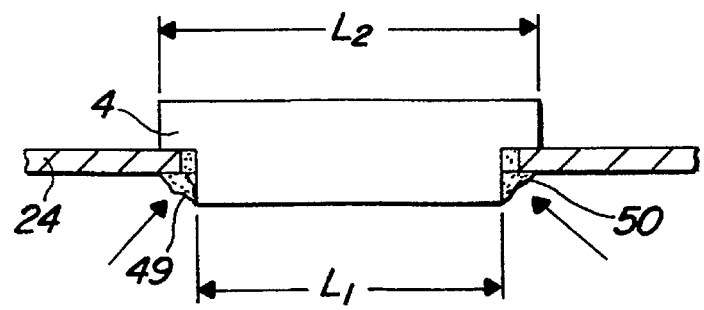
FIG. 22C is an enlarged cross sectional view showing a variation of the mounting structure shown in FIG. 22B.

FIG. 22A is a perspective view of a spring arm of a thirteenth embodiment of a magnetic head unit according to the present invention; FIG. 22B is an enlarged cross sectional view of a mounting structure of the core slider shown in FIG. 22A; FIG. 22C is an enlarged cross sectional view showing a variation of the mounting structure shown in FIG. 22B. In the present embodiment, an opening 49 is provided in the gimbal 24, into which opening the core slider is inserted. The opening 49 is slightly larger than the outer dimension of the core slider 4.

The core slider 4 is mounted in a state where side faces of the slider core 4 is fixed, as shown in FIG. 22B, by adhesive 50 to the outer edge of the opening 49. Alternatively, as shown in FIG. 22C, the core slider 4 may be formed to have a step in its side surface so that dimension $L_2$ is larger than dimension $L_1$. The dimension of the opening is determined to be a value between $L_1$ and $L_2$. The adhesive such as UV cure resin is applied to the outer edge of the opening after the core slider 4 is inserted into the opening 49. An ultra-violet beam is then irradiated from a direction indicated by an arrow in FIG. 22C so as to cure the UV cure resin.

In the present embodiment, since the core slider 4 is supported at the side surfaces thereof, stress generated by thermal expansion of the gimbal 24 is lessened. Accordingly, deformation of the core slider 4 due to the thermal expansion of the gimbal can be efficiently prevented.

It should be noted that the magnetic heads shown in FIGS. 20A and 22A are formed with an MR element formed by means of thin-film technology. Thin-film type magnetic head elements are formed on the MR element. However, the present invention is not limited to the specific magnetic head, and a conventional thin-film type magnetic head or a monolithic type magnetic head may be used.

The present invention is not limited to the specifically disclosed embodiments, and variations and modifications may be made without departing from the scope of the present invention.

What is claimed is:

1. A magnetic head unit used for a magnetic disk apparatus, said magnetic head unit comprising:

a magnetic head;

a spring arm having a gimbal portion, a bent portion and an attachment portion, said gimbal portion being provided for mounting said magnetic head, said bent portion being provided between said gimbal portion and said attachment portion so that an elastic force for pressing said magnetic head onto a magentic disk is generated, said attachment portion being provided for mounting said spring arm to a rigid arm; and a conductive-pattern layer for transmitting electric signals to and from said magnetic head, said conductive pattern layer passing along a surface of said spring arm and extending from said gimbal portion across said bent portion to said attachment portion;

wherein said bent portion comprises means for relaxing a bending force applied to said conductive-pattern layer when said bent portion is bent.

2. The magnetic head unit of claim 1 wherein said relaxing means comprises a first portion and a second portion, said first portion being bent for generating the elastic force, said second portion being bent separate from said first portion; and said conductive-pattern layer passing along a surface of said second portion.

3. The magnetic head unit of claim 2 wherein an opening is formed between said first portion and said second portion so as to separate said second portion from said first portion.

4. The magnetic head unit of claim 2, wherein said second portion is recessed from said first portion so as to separate said second portion from said first portion.

5. The magnetic head unit of claim 2, wherein said relaxing means includes a dispersing-pattern layer formed on a surface of said bent portion, for dispersing a force exerted on said conductive-pattern layer during a bending process for said bent portion.

6. The magnetic head unit as claimed in claim 5, wherein said dispersing-pattern layer comprises a widened portion located in said bent portion, said widened portion having a width wider than other portions of said conductive-pattern layer.

7. The magnetic head unit of claim 5, wherein said dispersing-pattern layer comprises a zigzagging portion located in said bent portion, said zigzagging portion comprising a portion of said conductive-pattern layer extending in a direction oblique to a direction in which other portions of said conductive-pattern layer extend from said first portion to said second portion.

8. The magnetic head unit of claim 5, wherein said dispersing-pattern layer comprises at least one dummy-pattern layer located in said bent portion, said dummy-pattern layer having the same structure as that of the conductive-pattern layer.

9. The magnetic head unit of claim 5, wherein said dispersing-pattern layer comprises a protective layer formed over said conductive-pattern layer located on said bent portion of said spring arm, said protective layer comprising an insulating layer and a conductive layer having the same structure as that of said conductive-pattern layer.

10. The magnetic head unit of claim 5, wherein said dispersing-pattern layer comprises at least one extra conductive-pattern layer extending from said gimbal portion to said attachment portion, both ends of said extra conductive-pattern layer being connected to said conductive-pattern layer, said extra conductive-pattern layer having the same structure as that of said conductive-pattern layer.

11. A method for making a magnetic head unit having a magnetic head, a spring arm having a gimbal portion, a bendable portion and an attachment portion, comprising the steps of:

mounting the magnetic head on the gimbal portion;

mounting a conductive-pattern layer, for transmitting electric signals to and from said magnetic head, along a surface of the spring arm, said conductive-pattern layer extending from the gimbal portion across a first part of the bendable portion to the attachment portion; and bending the bendable portion into a bent part by pressing a bending device against a second part of the bendable portion other than said first part having said conductive-pattern layer, said bent portion being provided between said gimbal portion and said attachment portion so that an elastic force for pressing the magnetic head onto a magnetic disk is generated.

\* \* \* \* \*